United States Patent [19]

Serpell

[11] Patent Number: 4,633,037
[45] Date of Patent: Dec. 30, 1986

[54] GENERATION OF IDENTIFICATION KEYS

[75] Inventor: Stephen C. Serpell, Ipswich, England

[73] Assignee: British Telecommunications public limited company, London, England

[21] Appl. No.: 581,898

[22] Filed: Feb. 21, 1984

[30] Foreign Application Priority Data

Feb. 22, 1983 [GB] United Kingdom ................ 8304876
Feb. 22, 1983 [GB] United Kingdom ................ 8304877

[51] Int. Cl.$^4$ ............................................. H04L 9/00
[52] U.S. Cl. .............................. 178/22.14; 178/22.16; 178/22.09
[58] Field of Search ............... 178/22.08, 22.09, 22.16, 178/22.14

[56] References Cited

U.S. PATENT DOCUMENTS

| | | | |
|---|---|---|---|
| 3,798,605 | 3/1974 | Feistel . | |
| 4,193,131 | 3/1980 | Lennon et al. | 178/22.09 |
| 4,264,782 | 4/1981 | Konheim | 178/22.09 |
| 4,302,810 | 11/1981 | Bouricius et al. | 178/22.16 |
| 4,349,695 | 9/1982 | Morgan et al. | 178/22.09 |
| 4,423,287 | 12/1983 | Zeidler | 178/22.08 |

FOREIGN PATENT DOCUMENTS 002580 of 0000 European Pat. Off. .
029894 of 0000 European Pat. Off. .
089087 of 0000 European Pat. Off. .
082958 of 0000 European Pat. Off. .

OTHER PUBLICATIONS

Proceedings of the National Electronics Conference, vol. 35, Oct. 1981; pp. 309-314, Oak Brook, Illinois, U.S. S. M. Matyas et al: "Cryptographic Authentication Techniques in PIN-Based Electronic Funds Transfer Systems" p. 310, line 27, p. 311, line 1.
Seventeenth IEEE Computer Society International Conference, 5th, 8th Sep. 1978, Washington, D.C. pp. 351-354, NY, U.S. M. Sendrow: "Key Management in EFT Networks" p. 352, left hand column, lines 14-25; right hand column, lines 11-16; p. 353 left hand column, lines 45-49.
IBM Technical Disclosure Bulletin, vol. 22, No. 12, May 1980, p. 5281, New York, U.S. M. L. Martin: "Data Encryption in a Multi-Terminal System" p. 5281.
1978 National Telecommunications Conference, vol. 2, Dec. 1978, pp. 26.1.1.-26.1.6., New York U.S. R. E. Lennon, et al: "Cryptographic Key Distribution Using Composite Keys" p. 26.1.2. left-hand column, lines 11-34.

Primary Examiner—Salvatore Cangialosi
Assistant Examiner—Aaron J. Lewis
Attorney, Agent, or Firm—Nixon & Vanderhye

[57] ABSTRACT

Commercial transactions conducted over a telecommunications link are verified using a transaction key available at both ends of the link. The transaction key is produced by combining (1) data supplied to the retailer by a customer and stored by the bank with (2) data stored by the retailer. The telecommunications link includes a node which passes the retailer's data to the bank in the form of a label obtained by encrypting the retailer's code with a client code. The bank retrieves the bank code and decrypts the label to obtain the retailer's code. The bank also retrieves the customer's data and combines the two elements to obtain the same transaction key that was created at the retailer's terminal.

14 Claims, 4 Drawing Figures

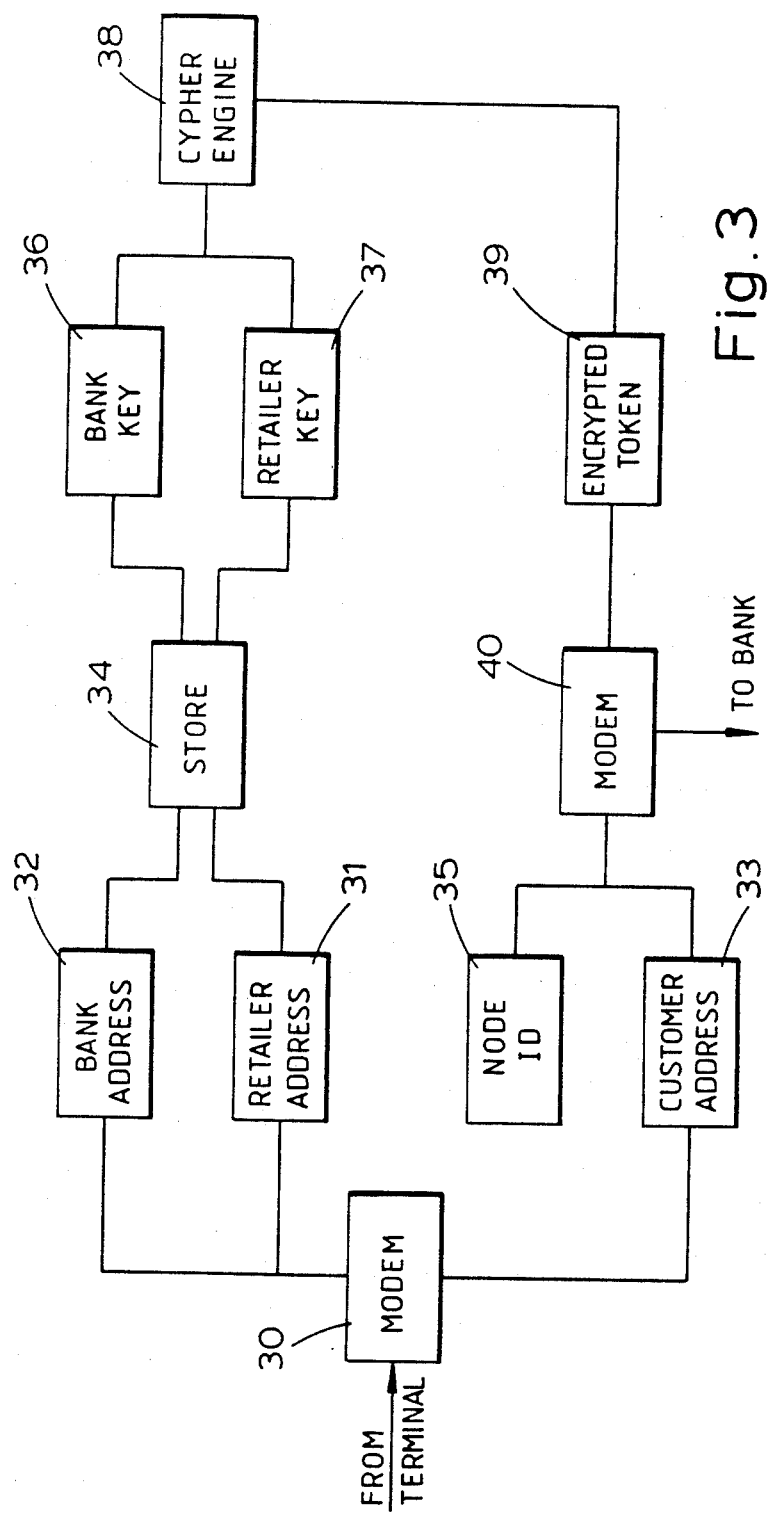

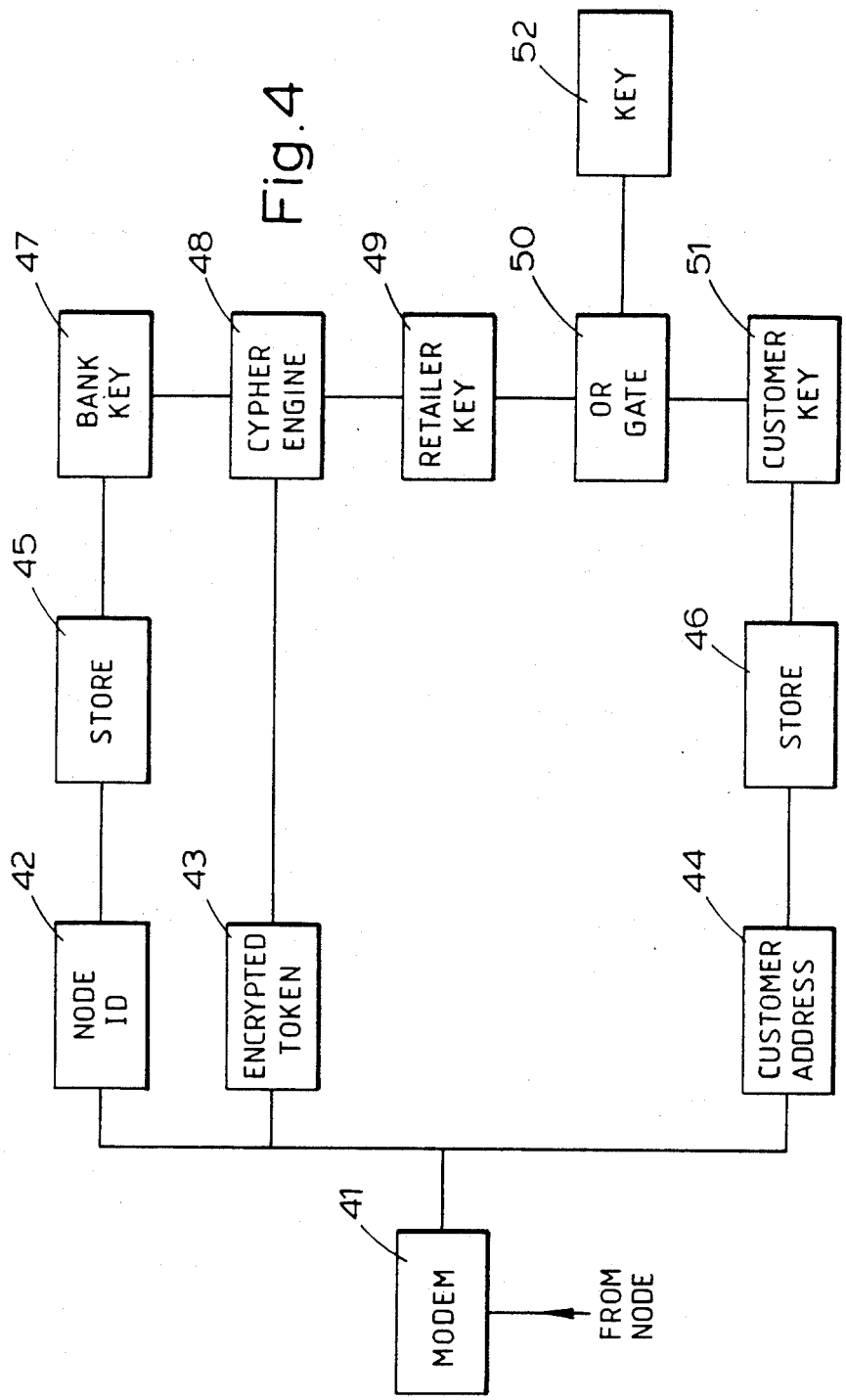

GENERATION OF IDENTIFICATION KEYS

This invention relates to the generation of identification keys and especially identification keys for use in the automatic transfer of funds by telecommunication networks.

This application is related to my copending applicatin Ser. No. 581,897 filed concurrently herewith.

The transfer of funds involves three parties, namely,
(1) the customer
(2) the retailer
(3) the customer's bank
and verifying the identities of the parties is important, e.g. to prevent frauds or other criminal activities. Systems of this nature utilize identification keys which must be kept secret. Two such keys are needed, i.e.
(a) a key known only to the customer and the bank
(b) a key known only to the retailer and the customer's bank.

A large system might include 100 banks and 100,000 retailers. Any one of the retailers must be able to deal with any one of the banks so that the number of possible pairings is the product of 100 and 100,000; i.e. $10^7$. Therefore, the system would need $10^7$ different secret keys each of which is present at two locations, i.e. a bank and a retailer. Thus there would be 100,000 retailers each with 100 keys and 100 banks each with 100,000 keys.

Such a system is cumbersome to the point of being impractical. It is an object of the present invention to reduce the number of keys without substantially reducing the security.

This invention automatically generates an identification key for use in the automatic verification of a transaction involving the transfer of funds by means of a telecommunications link which includes at least one nodal station contributing to the cryptographic function wherein said link connects a first station to a second station. In a preferred form of the invention there is only one nodal station in the link. The key is generated by combining an identification code acquired at the first station (hereinafter the "acquired code"), e.g. by automatically reading a customer's card, with an identification code stored at a first location (hereinafter the "station code"). The combination is preferably achieved by using an or-gate on corresponding bits of the two identification codes. The same two identification codes are required at a second location whereby the same combination is performed to generate the same identification key at both first and second stations. (The first station is usually a retailer's terminal and the second station is usually the automatic processing equipment of a bank, conveniently referred to as "the bank".)

The acquired code is available at the second location because it is the practice of banks to store data relating to their customers. The first station also acquires the storage address of the acquired code at the second station and this address is passed, via the telecommunications link, to the second station. Thus the second station can retrieve the acquired code from its storage means. For the reasons given above, it is inconvenient to store at every bank all the data stored at all the terminals of all the retailers. Thus the station code is stored at the first station and at a nodal station but not at the second station. According to this invention the station code is passed from the nodal station to the second station by an automatic method wherein each nodal station receives a message from a predecessor station, and transmits a message to a successor station wherein each nodal station:

(a) accesses storage means using as address the identity of its predecessor station to retrieve a predecessor key;
(b) accesses storage means using as address the identity of the successor station to retrieve a successor key;
(c) encrypts the predecessor key as data with the successor key as key to generate a label;
(d) concatenates the label with the received message to generate an extended message which is the message transmitted to the successor station.

The message received at the second station includes a label generated at each nodal station. The second station uses the identity of the last nodal station as address to retrieve the key needed to decrypt the first label. This reveals a key which decrypts another label and the process continues until all the labels are decrypted whereby the key used at the first station is revealed. The second station thus has the two identification codes neded for combination to generate the key.

It is emphasized that the station code is potentially available at any nodal station but an outsider would require knowledge of an appropriate key to decrypt the labels and obtain the station code. However, the key used for the transaction also requires that the acquired code be available. This key is not available at any nodal station (and it is not available to an outsider).

Our corresponding patent application (BT Patent Case 22963) 22963 describes (U.S. application Ser. No. 581,897, filed concurrently herewith) describes an automatic process for confirming identities at two different stations which method comprises:

(a) at the first station:
  (i) generating a first verification code by encrypting data with a first identification key available at the first station
  (ii) transmitting said first verification code to the second station
(b) at the second station:
  (i) receiving said first verification code
  (ii) decrypting said first verification code using a first verification key available at the second station
  (iii) generating a second verification code by encrypting the de-crypt obtained in (b) (ii) with a second verification key available at the second station
  (iv) transmitting said second verification code to the first station;
(c) at the first station:
  (i) receiving the second verification code
  (ii) utilizing a second verification key available at the first station to confirm that second verification code is derived from the same data as the first verification code.

It is preferred to operate this process and the process of this invention in conjuction. Preferably the two methods are operated simultaneously. To utilize the combination, the "first identification key" specified in (a) (i) is the "identification key" generated by combining the "acquired code" and the "station code" of this invention. The "second verification key" specified in (b) (iii) is also sorted at the second location and acquired at the first location.

In a commercial transaction it is desirable to provide good security for the identification of a customer. It is conventional for persons to carry a card on which is recorded, in machine readable form, identification data. In case the card is lost the owner remembers a "personal identity number" or "PIN" which is provided to a retailer's terminal by means of a key pad. Identification which includes the PIN sometimes fails, even in the absence of fraud, because of human error in entering the PIN.

In the operation of the method according to the invention it is preferred that the "acquired code" uses only data recorded on the card, which has the result that the "identification key" is not affected by human error. The "second verification key", which is retrieved from storage at the second station, preferably depends on the PIN, but the retrieval at the second station depends on an address automatically read from a card. The second station therefore returns a message to the first station which the first station tries to verify using the human-entered PIN.

The process is initiated at the first station, e.g. after a retailer's terminal has acquired the relevant data from a customer. The initiation usually comprises the automatic transmission of a message to a nodal station, said message including:
(a) an identification of the first station;
(b) an identification of the second station;
(c) the address of the acquired code at the second station, and, preferably;
(d) A transaction component, being a definition of the proposed transaction and/or a random element, said transaction component being encrypted with the transaction key generated by combining the acquired code and the station code.

Item (b) is used at each nodal station to select a successor station and set up a telecommunication link thereto. As stated above, item (b) is also used as the address to retrieve the successor key.

The second key station decrypts all the labels and forms the transaction key as described above. It uses the transaction key to decrypt item (d) and verifies that the proposed transaction is permissible. If all is in order, the second station re-crypts the random element with a PIN related key and returns the encrypted message to the first station. The return does not need to pass via the nodal stations; any route set up by the public switched method is suitable. The first station decrypts the returned message and verifies identity using a key derived from the PIN input by a (human) customer on its key pad. This final step may fail because of human error and it is usual to offer the customer a plurality of attempts, e.g. up to four, to correct the error, but all these re-trials involve only the first location. It is clearly desirable that data representations transmitted through the nodal stations should all be produced automatically whereby all transmitted data representations have machine accuracy.

An embodiment of the invention will now be described by way of example with reference to the accompanying drawings in which:

FIG. 3 illustrates the equipment at a node, and

FIG. 4 illustrates the equipment at the second station, e.g. at a bank's terminal.

Figure 1:
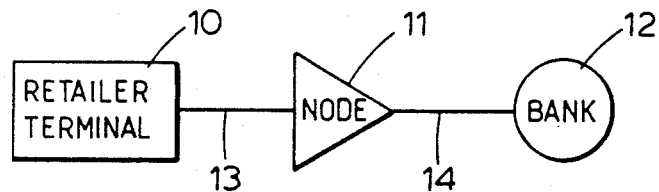
FIG. 1 illustrates one link which is set up for a single transaction.
Figure 2:
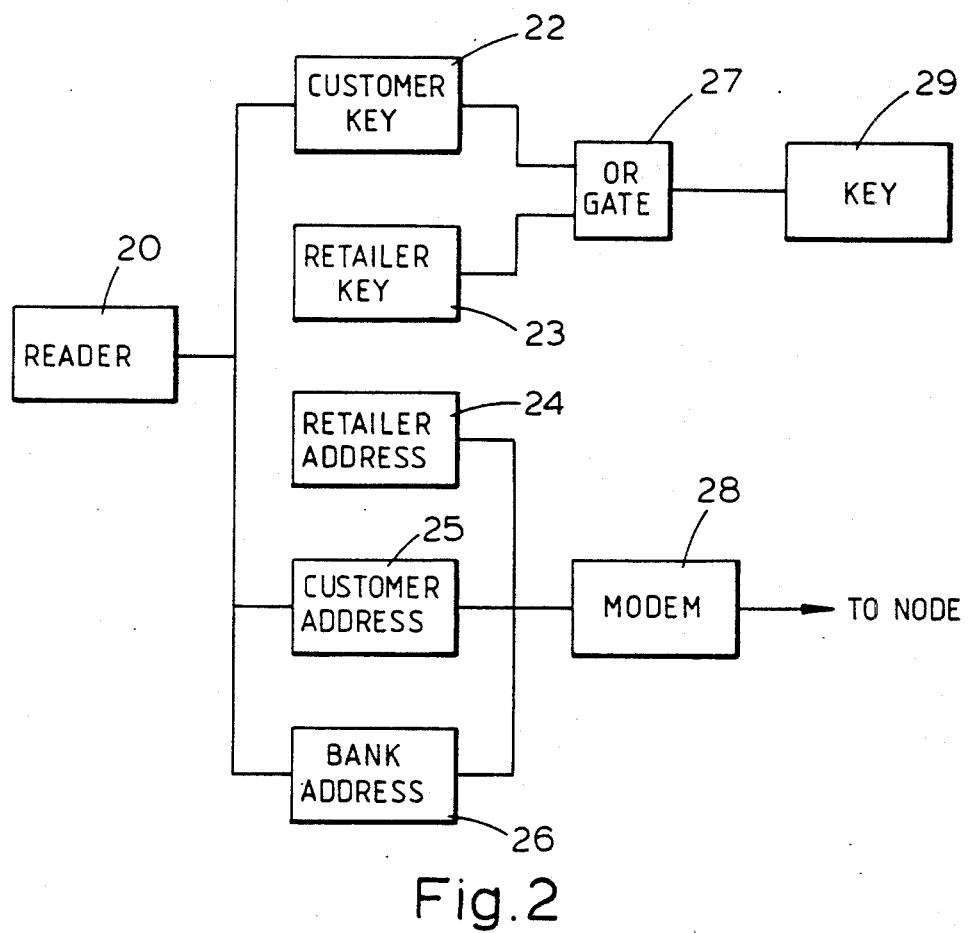
FIG. 2 illustrates the equipment at the first station, e.g. a retailer's terminal.

In an extensive fund transfer system, e.g. covering the whole British Isles or the whole of the European Economic Community, there would probaby participate more than 100,000 retailers and more than 100 banks. It would be inconvenient to provide initial direct access from every retailer to every bank since this would require at least $10^7$ keys. This invention links the retailer and banks via nodal stations which perform cryptograph functions.

For example, the system could comprise 100 nodal stations each of which can be contacted, via a public switched telecommunications network, by 1000 retailers and 100 (i.e. all) the banks. (This reduces the number of keys from $10^7$ to $2 \times 10^5$.)

It should be noted that this preferred embodiment utilizes only one nodal station in any one link, and the term "node" will be used to imply a link of this type.

It is emphasized that the stations (i.e. first, second and nodal) communicate via a public switched telecommunications network which sets up the links needed to perform the method of the invention. The network includes switching centres which are included in the links. The switching centres do not contribute to the cryptographic system and the switching centres are not to be identified with nodal stations.

The terminal 10, of a retailer reads a customer's card in reader 20. This identifies the customer and his bank 12. Terminal 10 which has access to node 11 by modem 28, (but not to any of the other 99 nodes in the network) transmits via link 13 this information to node 11 which sets up a connection 14 to bank 12. For verification, a transaction key is generated and this key is known only to terminal 10 and bank 12. It is an important feature that the transaction key is not kown to node 10, or anything else in the circuit except the two ends. Link 13 and connection 14 are provided by a public switched network and, as is conventional, both include one or more switching centres.

The transaction key is generated at terminal 10 and bank 12 from the following information.

(1) Customer data This is information contained on a data card carried by the customer and, optionally, from a personal identification number known to the customer but not on the card. This information is acquired by card reader 20 and/or entered by the customer on a key pad (not shown) and entered therefrom into storage means 22 and 25 comprised in terminal 10. Similar information is also contained in storage means 46 at the bank 12 (but it is not available at node 11.)

(2) Station Key of the Retailer This is a secret key available only at the terminal 10 in store 23 and the node 11 in store 34. The node 11 holds 1000 such keys in storage means 34 and, when a terminal identifies itself, the node retrieves the right key be accessing its storage means 34. The retailer's key is not available at the bank 12.

(3) Bank Key This is a secret key available only at node 11 and bank 12. Each bank holds this key in its own storage means. The bank key is not available at the terminal 10. The bank-store 45 holds a different key for each node; the node-store 34 holds a different key for each bank.

The generation of the transaction key will now be described.

Terminal 10 acquires customer data and the address of the customer's bank from card reader 20. The customer data is placed in stores 22 and 25; the bank's address is placed in store 26. The terminal holds the station key in store 23 and the retailer's identity in store 24.

The customer data, in store 22, is combined with the station key, in store 23, using or-gate 27 on corresponding bits as in one-shot-pad encryption. This produces a transaction key which is stored in store 29 at terminal 10 and which has to be made available at bank 12 without transmission.

The terminal 10 sends, by means of modem 28, a signal to the node 11, which signal contains, in clear and intelligible form, its own identity from store 24, the (alleged) identity of the customer from store 25 and the identity of the customer's bank from store 26. No keys are transmitted; this is an important feature of the system.

The node receives the signal on modem 30 and separates it to hold the retailer's identity in store 31, the bank's identity in store 32 and the customer's identity in store 33.

Random access storage means 34 is addressed using the content of store 31 (i.e. the retailer's identity) to retrieve the retailer's key which is placed in store 37. RAM 34 is also addressed using the content of store 32 to retrieve the bank key which is placed in store 36. Cypher engine 38 uses the content of store 37 (i.e. the retailer key) as data and the content of store 36 (i.e. the bank key) as key to produce an encrypted token which is placed in store 39.

The node concatenates:
(a) the content of store 33 (i.e. the customer's alleged identity);
(b) the content of store 35 (i.e. the identity of the node 11);
(c) the content of store 39 (i.e. the encrypted token); and modem 40 transmits the resulting string to the bank 12.

The bank 12 receives the composite signal on modem 41 and separates it to obtain the following three items:
(a) the alleged identity of the customer, which is stored in store 44;
(b) the identity of the node 11, which is stored in store 42; and
(c) the encrypted token, which is stored in store 43.

These are used in four steps as follows:

STEP I

Item (a) is retrieved from store 44 and used to address the bank's storage means 46 to retrieve customer data (which should be identical with that read at terminal 10) and which is placed in store 51.

STEP II

Item (b) is retrieved from store 42 and used to address the bank's storage means 45 to retrieve a bank key (which should be identical to that used at node 11) and which is placed in store 47.

STEP III

Item (c) is retrieved from store 43 and decrypted by cypher engine 48 using as key the content of store 45. The decrypt (which should be the station key used by node 11) is stored in store 49.

STEP IV

The content of store 49 (i.e. the retailer key generated in step III) is combined with the content of store 51 (i.e. customer data retrieved in step I) in or-gate 50 and the result is stored in store 52. This replicates the process used at terminal 10. This should generate the same transaction key which is stored at terminal 10. As this key is known at both ends, it can be used to validate the transaction.

It will be apparent that any failure to retrieve correct data will cause the sequence to fail and abort the transaction. Any criminal attempt to operate a dishonest sequence would require exact knowledge of all the keys. Therefore keeping the keys secret is an important requirement for a sure and secure operation.

As a modification to enable the system to operate even if node 11 fails, the terminal 10 may have access to an alternative node (not illustrated). This modification preferably requires a second key at the terminal.

Encryptions are preferably performed using DES algorithm as described in "FIPS PUB 46" of National Bureau of Standards of Department of Commerce of U.S. Government.

The keys can be used to operate the system described in our pending patent application (BT patent case 22963) U.S. application Ser. No. 581,897, filed concurrently herewith.

The above description is based on a transaction involving a customer, a retailer and the customer's bank wherein communication is via a node in a telecommunication network. It is a feature of the invention that an important part of the verification is assigned to the node. The invention is generally applicable where it is convenient to assign part of the verification to a node or to verify that communication passed via an expected node. Thus the transaction would also involve the retailer's bank and communication would also pass via the node. This part of the transaction could also be verified by the invention, e.g. by replacing "Customer data" (item (1) above) by "Retailer data" available at the retailer's terminal and the retailer's bank (but not at the node).

The description above relates to a preferred embodiment wherein there is only one node between the first and second stations. In certain circumstances it is desirable to utilize a chain of nodal stations, each of which operates as described above, with the key of its predecessor in store 37 and the key of its successor in store 36. The bank decrypts each label in turn and each decryption reveals the key for use in the next step.

A system with $10^7$ retailers and 1,000 banks linked via 10,000 nodes would require $10^7$ keys for use between nodes and retailers and $10^{10}$ keys for use between nodes and banks. It is possible to reduce the number of keys by utilizing links with two nodal stations, i.e. retailer nodal stations which communicate primarily with retailers and bank nodal stations which communicate primarily with banks.

Using 10,000 retailer nodal stations and 10 bank nodal stations would reduce the number of keys to $10^7$ for use between retailers and retailer nodal stations; 1,000 for use between banks and bank nodal stations and 100,000 between nodal stations.

In use, the first station initiates the processes as described above and sends a message to its retailer nodal station which forms a first label by encryptioning a first key with a second key. The retailer nodal station concatenates the first label and passes on the message to the bank nodal station appropriate to the desired second station. The bank nodal station forms a second label by encrypting the second key with a third key, concatenates the second label with the message and sends it to the second station.

The second station retrieves the third key and decripts the second label to reveal the second key. It then uses the second key to decrypt the first label and reveal the first key. At this point the system proceeds as described above.

It is emphasised that the methods disclosed herein are automatic methods carried out electronically. Reference to "Key", "Data" and "Information" should be construed as representations suitable for automatic processing. Different forms of representation are appropriate in different parts of the method, e.g. electromagnetic or electrical pulses during transmission, magnetisation for storage and voltage or currents for processing elements.

I claim:

1. A method for automatically establishing a transaction key at predetermined first and second stations in a system having a multitude of similar first and second stations joined by means of a telecommunication link and including but a single intermediate or nodal data processing station connected between said predetermined first and second stations, without revealing said transaction key at said nodal station, said method comprising the steps of:
   (a) at the predetermined first station
      (i) combining first data available at both said predetermined first and second stations with second data available at the first station and the nodal station, to generate the transaction key for use in encrypting further data to be transmitted to said second station,
      (ii) transmitting to the nodal station third data identifying the first station, the second station and the address of the first data at the predetermined second station;
   (b) at the nodal station
      (i) accessing nodal storage means using the identity of the predetermined first station as an address to retrieve pre-stored data corresponding to said second data used in step (a) (i),
      (ii) accessing nodal storage means using the identity of the predetermined second station as address to retrieve an encryption key characteristic of said second station,
      (iii) producing an encrypted label by encrypting the pre-stored data retrieved in step (b) (i) with the encryption key retrieved in step (b) (ii),
      (iv) transmitting to the second station the identity of said nodal station;
   (c) at the predetermined second station
      (i) accessing storage means located at the second station using the identity of the nodal station as address to retrieve an encryption key characteristic of the predetermined second station,
      (ii) decrypting the label with the key retrieved in step (c) (i),
      (iii) accessing storage means located at the second location using the address of the first data transmitted from the first station,
      (iv) combining the data retrieved in step (c) (iii) with the decrypt from step (c) (ii) in a replication of step (a) (i) to generate said transaction key at said second station;
wherein, in a correct operation of the sequence, the data retrieved in step (c) (iii) is the same as the first data used in step (a) (i), and the decrypt obtained in step (c) (ii) is the same as the second data used in step (a) (i),
whereby the transaction key produced in step (c) (iv) is the same as the transaction key produced in step (a) (i).

2. A method of accoding to claim 1, wherein step (a) (ii) further includes the transmission of data representing the identity of the predetermined first station and additional data being transmission data encrypted with the transaction key code established in step (a) (i), as key.

3. A method according to claim 2, wherein the transmitted data includes a random element.

4. A method according to claim 2, wherein a further step (b) (iv), occurring between steps (b) (iii) and (c) (i), includes transmitting data representing the identity of the nodal station, and forwarding the encryped additional data received from the predetermined first station.

5. A method according to claim 4, wherein the predetermined second station decrypts the encrypted additional data using as key the transaction key generated in step (c) (iv).

6. A method according to claim 5, in which the transaction keys of steps (a) (i) and (c) (iv) are generated by an exclusive-or-gate.

7. A station, adpated to participate in a method according to claim 2, as said predetermined first station and comprising;
   (a) input means for acquiring
      (i) data representing identification of a second station,
      (ii) said first data, and
      (iii) data representing an address where the first data is stored at the second station;
   (b) storage means operatively connected to the input means for storing the data acquired by the input means;
   (c) storage means for storing said second data representing a station code;
   (d) combining means for combining the first data and the second data;
   (e) concatenating means for producing message data by contatenating the data representing the identity of the second station, the address of the first data at the second station and data representing an identification of the predetermined first station; and
   (f) means, operatively connected to the concatenating means, for transmitting the message to a nodal station.

8. A first station according to claim 7, wherein the combining means is an exclusive-or-gate means for accepting and combining the first data and second data as input.

9. A station, adapted to participate in a method according to claim 5 as said predetermined second station and comprising
   (a) storage means for storing data representing
      (i) the identity of nodal stations properly able to communicate with the second statin, and
      (ii) the identity of customers associated with this second station;
   (b) retrieval means for accessing the storage means with data representing the identity of a nodal station and retrieving a key associated with this second station;
   (c) cypher engine means for decrypting a label using as key the retrieval key of this second station;

(d) retrieval means for accessing the storage means with the data representing the identity of a customer as address to retrieve the first data also used at the first station; and (e) combining means for combining the locally retrieved first data with the retrieved key of this station to obtain the transaction key.

10. A station according to claim 9, wherein the combining means is an exclusive-or-gate means for accepting the retrieved key of this station obtained from said cypher engine means and the locally retrieved first data from the retrieval means as input.

11. An automatic process for establishing the same cryptographic identification key at first and second stations joined by a telecommunications link which includes a data processing nodal station, said establishment being achieved without revealing said key at said nodal station, which method comprises (a) at the first station
  (i) combining initiation data available at both first and second stations with identification code data available at the first station and said nodal station to generate the identification key;
  (iii) transmitting to the nodal station an identification of the first station, of the second station and the address of the initiation data also located in data storage means at the second station;

(b) at said nodal station accessing storage means at the nodal station using the identity of the first station as an address to retrieve identification code data corresponding to that used in step (a) (i) and passing said retrieved code data and the identity of said nodal station to the second station;

(c) at the second station
  (i) receiving the retrieved code data retrieved in step (b);
  (ii) accessing storage means located at the second location using the address transmitted from the first station to retrieve said initiation data;
  (iii) combining the retrieved initiation data retrieved in step (c) (ii) with the retrieved code received in step (c) (i) in a replication of step (a) (i) to locally generate said indentification key at said second station;

wherein, in a correct operation of the sequence, the initiation data retrieved in step (c) (ii) is the same as the initiation data used in step (a) (i) and the retrieved code received in step (c) (iii) is the same as the identification code data used in step (a) (i) whereby the identification key produced in step (c) (iii) is the same as the identification key produced in step (a) (i).

12. Apparatus to be located at a service point for achieving secure cryptographic data communication, concerning a customer to be serviced, with a predetermined one of plural remote stations via a predetermined one of plural intermediate data processing nodes and wherein (1) each said remote station maintains addressable stored key data KD1" for each valid customer and stored key data KD2" for the remote station addressable via data representing each valid node; and (2) each said node maintains node identification data NID for transmission to the remote station, addressable stored key data KD3' representing each valid service point, and addressable stored key data KD2' representing each valid remote station, wherein KD3' is encrypted by KD2' and transmitted to the remote station where it is decrypted by KD2" to yield key data KD3" corresponding to the service point which is then combined with DK1" to generate a cryptographic transaction key at the remote station; said apparatus comprising at each service point:

data reader means for generating key data KD1 and further data D1 representing said customer and for also generating data D2 representing the remote station;

data storage means for storing key data KD3 and further data D3 representing the service point;

key generation means for combining said DK1 and KD3 data to produce a cryptographic transaction key at the service point identical to the one generated at the remote station; and means for transmitting to said node said D1, D2 and D3 data.

13. Apparatus as in claim 12 further comprising at each node:

data storage means for storing said KD2' and KD3' data and for addressably accessing same using said D2 and D3 data respectively received from a service point;

data storage means storing said NID data;

encryption means for encrypting one of said accessed KD3' and KD2' data using the other as a key producing encrypted data KD2'(DK3'); and means for transmitting to said remote station said D1, KD2'(DK3') and NID data.

14. Apparatus as in claim 13 further comprising at each remote station:

data storage means for storing said KD1" and KD2" data and for addressably accessing same using said D1 and NID data respectively received from a node;

decryption means for decrypting said KD2'(KD3') data using said accessed KD2" data as a key producing decryped data KD3"; and key generation means for combining said KD1" and KD3" data to produce a cryptographic transaction key at the remote station identical to the one generated at the service point.

* * * * *